(12) United States Patent
Benhase et al.

(10) Patent No.: US 6,745,262 B1
(45) Date of Patent: Jun. 1, 2004

(54) METHOD, SYSTEM, PROGRAM, AND DATA STRUCTURE FOR QUEUING REQUESTS HAVING DIFFERENT PRIORITIES

(75) Inventors: Michael Thomas Benhase, Tucson, AZ (US); James Chienchiung Chen, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/478,942

(22) Filed: Jan. 6, 2000

(51) Int. Cl.[7] .................................................. G06F 3/00
(52) U.S. Cl. ........................... 710/40; 710/36; 710/39; 710/54; 711/120
(58) Field of Search ............................. 710/36, 39, 40, 710/54; 711/120

(56) References Cited

U.S. PATENT DOCUMENTS

| | | | |
|---|---|---|---|
| 4,926,418 A | | 5/1990 | Cidon et al. |
| 5,185,861 A | * | 2/1993 | Valencia ..................... 711/120 |
| 5,909,594 A | | 6/1999 | Ross et al. |
| 5,924,098 A | * | 7/1999 | Kluge ......................... 707/100 |
| 5,936,956 A | * | 8/1999 | Naven ...................... 370/395.7 |
| 5,960,434 A | * | 9/1999 | Schimmel .................... 707/100 |
| 6,317,872 B1 | * | 11/2001 | Gee et al. .................... 717/152 |
| 6,418,517 B1 | * | 7/2002 | McKenney et al. .......... 711/151 |
| 6,446,225 B1 | * | 9/2002 | Robsman et al. .............. 714/55 |
| 6,477,144 B1 | * | 11/2002 | Morris et al. ............. 370/230.1 |
| 6,487,212 B1 | * | 11/2002 | Erimli et al. ................ 370/413 |

* cited by examiner

Primary Examiner—Jeffrey Gaffin
Assistant Examiner—Niketa Patel
(74) Attorney, Agent, or Firm—David W. Victor; Konrad Raynes & Victor LLP

(57) ABSTRACT

Disclosed is a method, system, program, and data structure for queuing requests. Each request is associated with one of a plurality of priority levels. A queue is generated including a plurality of entries. Each entry corresponds to a priority level and a plurality of requests can be queued at one entry. When a new request having an associated priority is received to enqueue on the queue, a determination is made of an entry pointed to by a pointer. The priority associated with the new request is adjusted by a value such that the adjusted priority is associated with an entry different from the entry pointed to by the pointer. The new request is queued at one entry associated with the adjusted priority.

31 Claims, 5 Drawing Sheets

METHOD, SYSTEM, PROGRAM, AND DATA STRUCTURE FOR QUEUING REQUESTS HAVING DIFFERENT PRIORITIES

BACKGROUND OF THE INVENTION

1. Field of the Invention

The present invention relates to a system, method, program, and data structure for queuing requests capable of having different priority levels.

2. Description of the Related Art

In prior art servers, the server receives input/output (I/O) requests from multiple clients and queues the requests in the order received to execute against the storage device. In certain prior art network systems, the client does not transmit to the server the priority of the I/O request. Instead, each client would internally prioritize requests and send the higher priority requests before its lower priority requests. Clients withhold sending low priority requests because if the server does not know of the priority, then sending low priority requests before high priority could cause the server to queue the low priority requests before the high priority ones. Thus, the client delays sending low priority requests until all high priority requests have been sent. This technique of having each client individually prioritize I/O requests is problematic for at least two reasons. First is that a server may be capable of concurrently processing I/O requests that utilize different server resources. Thus, the server may be able to concurrently process a high priority request and low priority request requiring different resources when it would not be able to concurrently process two high priority requests. Because clients do not know the processing capabilities and resource availability at the server, the client may only transmit the high priority requests and withhold the low priorities when in fact the server could optimize throughput by concurrently processing both. Further, it may be more efficient for the server to process a low priority request before a high priority if the low and high priority requests are stored at physically adjacent locations in the storage medium. Processing the low priority before the high priority would avoid the need to seek and move back to the low priority storage location when the disk head is already adjacent to such location.

Another problem with client prioritization of requests is that there is no prioritization of requests between clients. For instance, if client A has I/O requests of priority 1 and 2 and client B has I/O requests of priority 3, then if both send their highest priority I/O requests, client A will send the requests of priority 1 and client B will send requests of priority 3. Client A will withhold the priority 2 requests until all priority 1 requests have been sent. If client A sends the priority 2 I/O requests after client B sends the priority 3 request, then the server will process the priority 3 requests first. This situation is non-optimal because the server will complete client B's priority 3 I/O requests before processing the later sent priority 2 requests from client A.

Given the above inefficiencies with allowing clients to do their own prioritizing, prior art techniques have been developed to allow clients to transmit priority information along with an I/O request. For instance, the Small Computer System Interface (SCSI) allows for two priorities, high and low, and the International Business Machines Corporation's (IBM) Enterprise System Connection (ESCON) allows the server to communicate 256 different priority levels. In SCSI, the server would maintain a queue for I/O requests having a head and a tail. High priority requests are enqueued at the head of the queue and low priority requests are enqueued at the tail. The SCSI server dequeues requests from the head. One problem with the SCSI prior art priority system is that if the SCSI server receives a lengthy stream of high priority requests, then it may not reach the low priority requests for a significant period of time; enough, in fact, to cause the low priority requests to time out, otherwise referred to as starvation. In the prior art ESCON system, the ESCON server maintains a separate queue for each of the 256 priorities and accesses I/O requests from the highest priority queue having pending I/O requests. In ESCON**, as with SCSI, a steady stream of high priority I/O requests could significantly delay the processing of the low priority requests.

One prior art solution to this problem of starvation of the low priority I/O requests is to occasionally increase the priority of the low priority requests by moving the low priority requests to a higher priority queue. For instance, after enqueuing a predetermined number of high priority requests, the server may move low priority requests to a higher priority queue. This technique works somewhat effectively when there are only a few levels of priority. However, as the number of possible priorities the server tracks increases, moving priorities from one queue to another, i.e., dequeuing and enqueuing I/O requests, can consume substantial memory resources to the point of significantly degrading memory performance. If the server, e.g., I/O processor, maintains multiple priority queues, then the server may have to move the low priority request each time the priority of lower priority requests is increased. For instance, if a low priority request is in the $256^{th}$ priority queue, then it is conceivable such request could be moved 255 times before being processed. If there are numerous requests being moved about, then the memory operations to move the I/O requests, i.e., enqueue and dequeue, between queues can significantly degrade overall memory performance.

Thus, as the number of priority queues managed by the server increases, with prior art techniques, the memory burden is twofold. First, the server must manage numerous priority queues and, second, there is a substantial increase in the dequeue and enqueue operations needed to move a low priority request from queue-to-queue as priority is adjusted upward to avoid starvation.

Thus, there is a need in the art to provide an improved mechanism for increasing priority of low priority I/O requests when a client communicates priority with the I/O request in a manner that does not impose substantial burdens on memory.

SUMMARY OF THE PREFERRED EMBODIMENTS

To overcome the limitations in the prior art described above, preferred embodiments disclose a method, system, program, and data structure for queuing requests. Each request is associated with one of a plurality of priority levels. A queue is generated including a plurality of entries. Each entry corresponds to a priority level and a plurality of requests can be queued at one entry. When a new request having an associated priority is received to enqueue on the queue, a determination is made of an entry pointed to by a pointer. The priority associated with the new request is adjusted by a value such that the adjusted priority is associated with an entry different from the entry pointed to by the pointer. The new request is queued at one entry associated with the adjusted priority.

In further embodiments, to process queued requests, a determination is made of an entry at which requests are queued. The pointer is modified to point to the determined entry and the requests queued at the entry pointed to by the pointer are processed.

In further embodiments, adjusting the priority comprises determining the priority of the entry pointed to by the pointer and adding the determined priority to the priority of the request to determine the adjusted priority. In embodiments where the last entry of the queue points to the first entry of the queue, adjusting the priority further comprises determining whether the adjusted priority is greater than the number of entries in the queue. If so, the adjusted priority is set to the adjusted priority modulo the number of entries in the queue.

Preferred embodiments provide a mechanism for queuing I/O requests that effectively reduces the priority of new requests relative to currently pending requests having lower priority. With preferred embodiments, priority of new requests are modified to prevent starvation of the lower priority requests through the use of mathematical operations and adjusting pointers without having to move lower priority queued entries to new queues. This is an improvement over prior art techniques that require that pending requests be moved between queues to adjust priority to avoid starvation. The queue of the preferred embodiments can adjust the priority to avoid starvation even if there are numerous possible priorities without substantially burdening and degrading memory performance.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
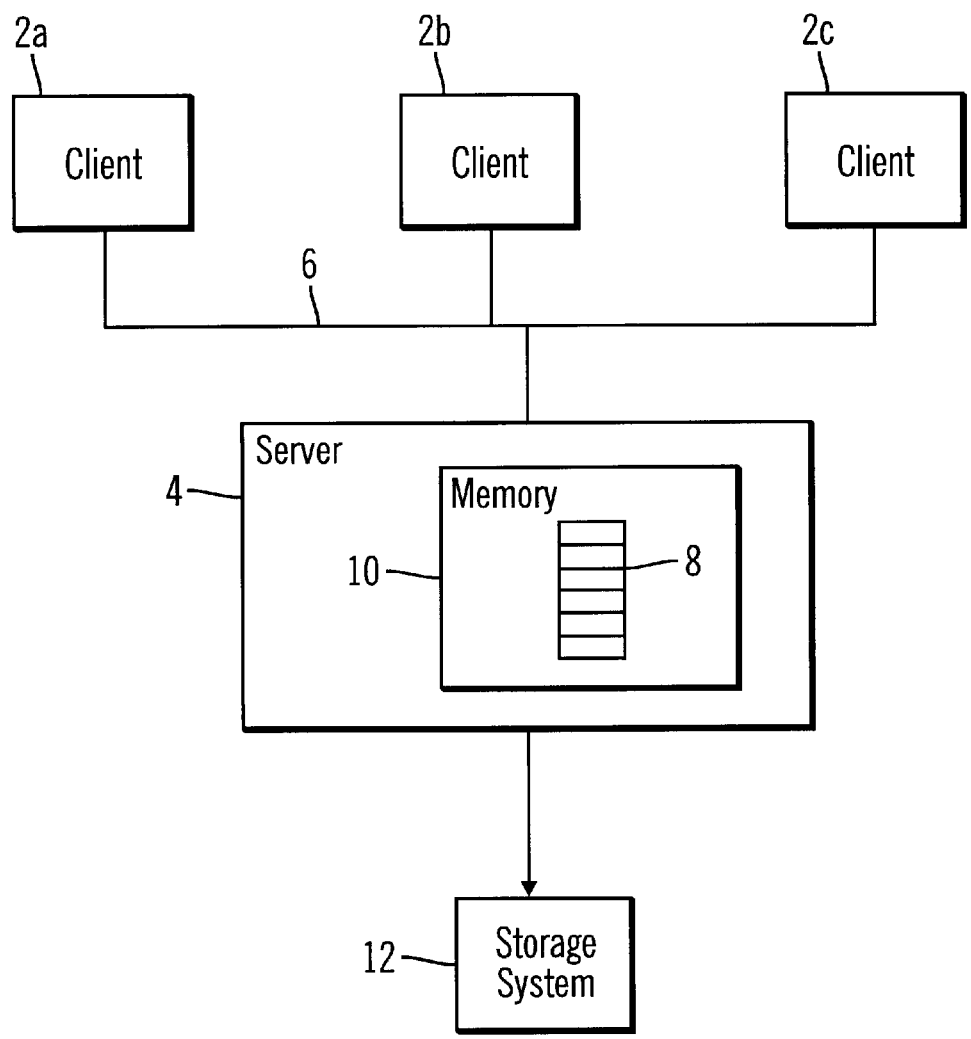
FIG. 1 is a block diagram illustrating a computing environment in which preferred embodiments are implemented.

FIG. 1 illustrates a computing environment in which preferred embodiments are implemented. A plurality of client systems 2a, b, c communicate I/O requests to server 4 over network 6. Server 4 enqueues the I/O requests in queue data structure 8 in server 4 memory 10. The server 4 processes the requests in the queue data structure 8 and executes the request against storage system 12. The clients 2a, b, c may be comprised of any type of computing device, such as a mainframe computer, that includes a computing architecture capable of communicating input/output (I/O) commands to the server 4.

The server 4 may comprise any type of server device capable of processing requests from multiple clients. The server 4 may comprise an ESCON director that receives requests from multiple clients 2a, b, c and forwards the requests to one or more storage controllers. In such an embodiment, the storage system 12 would comprise one or more storage controllers, such as the IBM 3990 Storage Controller, described in IBM publication, "IBM 3990 Storage Control Reference (Models 1, 2, and 3), IBM document no. GA32-0099-06 (Copyright IBM Corp. 1988, 1994), which publication is incorporated herein by reference in its entirety or the storage controller and host architecture described in the commonly assigned patent applications "Method And System For Dynamically Assigning Addresses To An Input/Output Device," by Brent C. Beardsley, Allan S. Merritt, Michael A. Paulsen, and Harry M. Yudenfriend, filed on Oct. 7, 1998, and having U.S. Pat. Ser. No. 09/167,782; and "System For Accessing An Input/Output Device Using Multiple Addresses," by Brent C. Beardsley, James L. Iskiyan, James McIlvain, Phillip R. Mills, Michael A. Paulsen, William G. Thompson, Harry M. Yudenfriend, filed on Oct. 7, 1998, and having U.S. Pat. Ser. No. 09/168,017, which patent applications are incorporated herein by reference in their entirety.

Alternatively, the storage system 12 may comprise a storage medium, such as a direct access storage device (DASD) comprised of interconnected hard disk drives, tape library, etc. In such embodiments, the server 4 would dispatch queued I/Os to execute against the storage system 12 to perform the requested I/O operation from the clients 2a, b, c.

Figure 2:
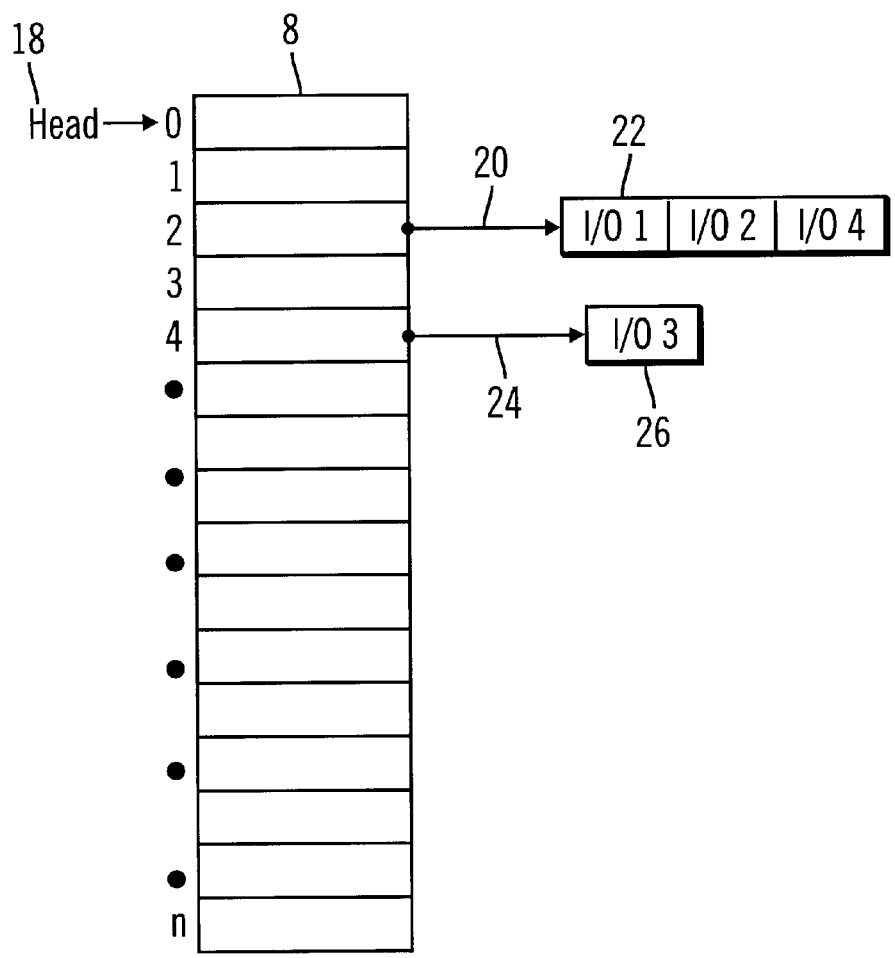
FIG. 2 illustrates a queue data structure for queuing I/O requests according to priority in accordance with preferred embodiments of the present invention.

FIG. 2 illustrates further detail of the queue data structure 8 in which preferred embodiments are implemented. The queue data structure 8 comprises a circular or ring buffer of entries, 1 to n, for each priority and a head entry 0. In addition to the head entry 0, there are n entries in the queue for each of a possible n priority levels supported in the system. For instance, in an ESCON system there would be 257 entries, one for each of the possible 256 ESCON priority levels and an additional entry. Each entry comprises a pointer or anchor to a queue of I/O requests having the priority of the entry. FIG. 2 shows that entries 2 and 4 have I/O requests, numbered in the order received. Entry 2 has a pointer 20 to a linked list 22 including all I/O requests, I/O 1, 2, 4, having the priority corresponding to the entry, e.g., priority level 2. Thus, linked list 22 comprises a singly linked list, where each I/O request includes a pointer to the next I/O request in the list. Similarly, entry 4 has a pointer 24 to a linked list 26 including the third received I/O request (I/O 3). The other entries may also each point to a linked list having queued I/O requests having a priority that is the priority associated with the entry.

Figure 3:
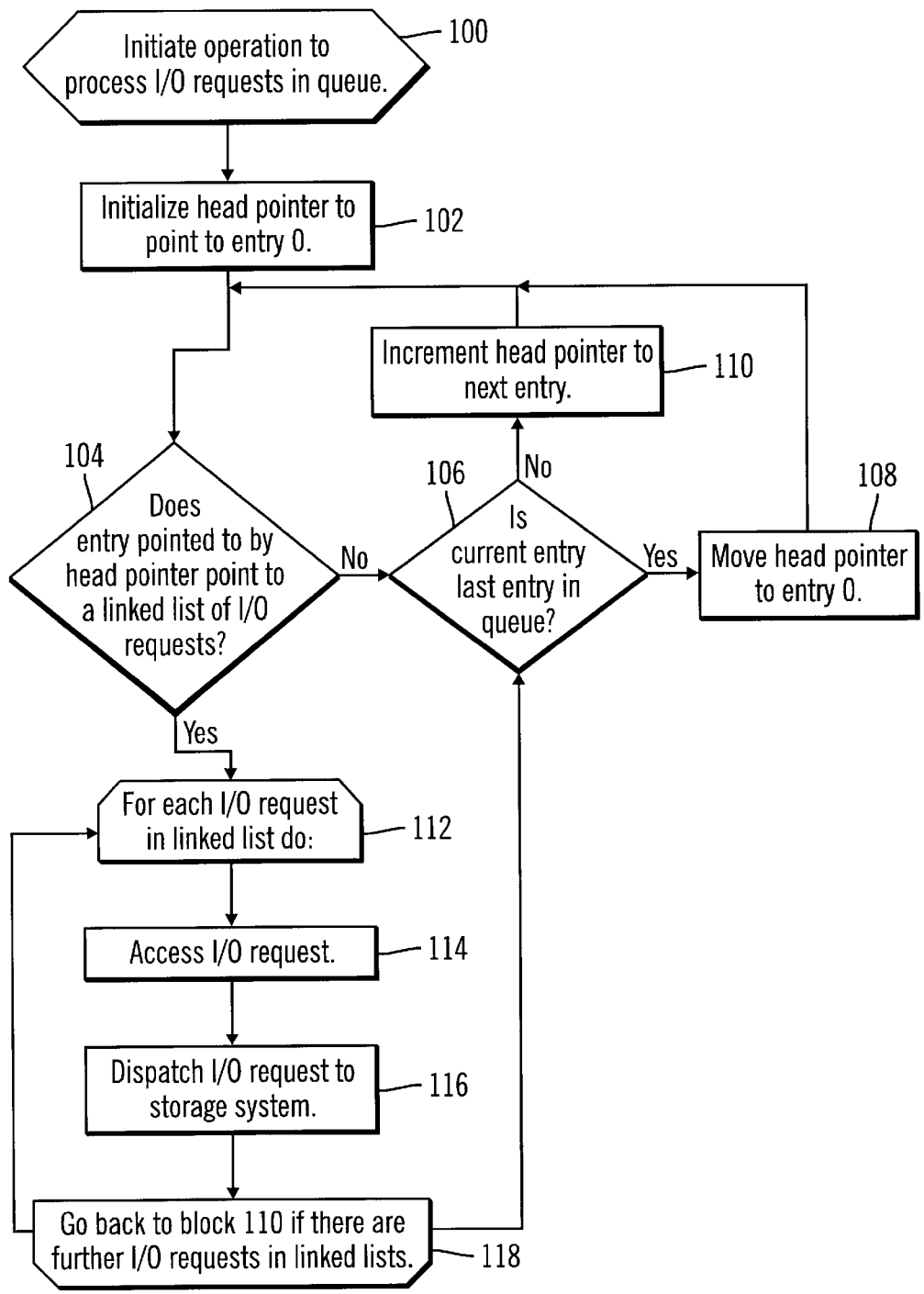
FIG. 3 illustrates logic to dequeue and process I/O requests in the queue illustrated in FIG. 2 in accordance with preferred embodiments of the present invention.

FIG. 3 illustrates logic implemented in the server 4 to process queued I/O requests from the clients 2a, b, c. Control begins at block 100 with the server 4 initiating an operation to process I/O requests in the queue 8 and initializing (at block 102) the head pointer 18 to point to entry 0. The server 4 determines (at block 104) whether the entry pointed to by the head pointer 18 points to a linked list including pending I/O requests. If not, then the server 4 determines (at block 106) whether the current entry is the last nth entry in the queue 8. If so, then the server 4 moves sets (at block 108) the head pointer 18 to point to entry 0; otherwise, the head pointer is incremented (at block 110) to point to the next entry in the queue 8. In this way, the queue 8 is a circular queue in that the last entry points back to the top entry. After incrementing to the next entry, from blocks 108 or 110, control proceeds back to block 106 to determine whether this entry points to a linked list of pending I/O requests.

If the entry pointed to by the head pointer 18 does point to a linked list of I/O requests, e.g., lists 20 and 24 in FIG. 2, then a loop begins at block 112 to process each I/O request in the linked list. For each I/O request in the list, the server 4 accesses (at block 114) the I/O request and dispatches (at block 116) the I/O request to the storage system 12. If there are further I/O requests, then at block 118 the server 4 proceeds back to block 112 to dispatch the next I/O request in the linked list. After dispatching all the I/O requests in the linked list, from block 118, the server 4 proceeds back to block 106 to increment the head pointer 18 to the next entry to consider any further linked lists.

Figure 4:
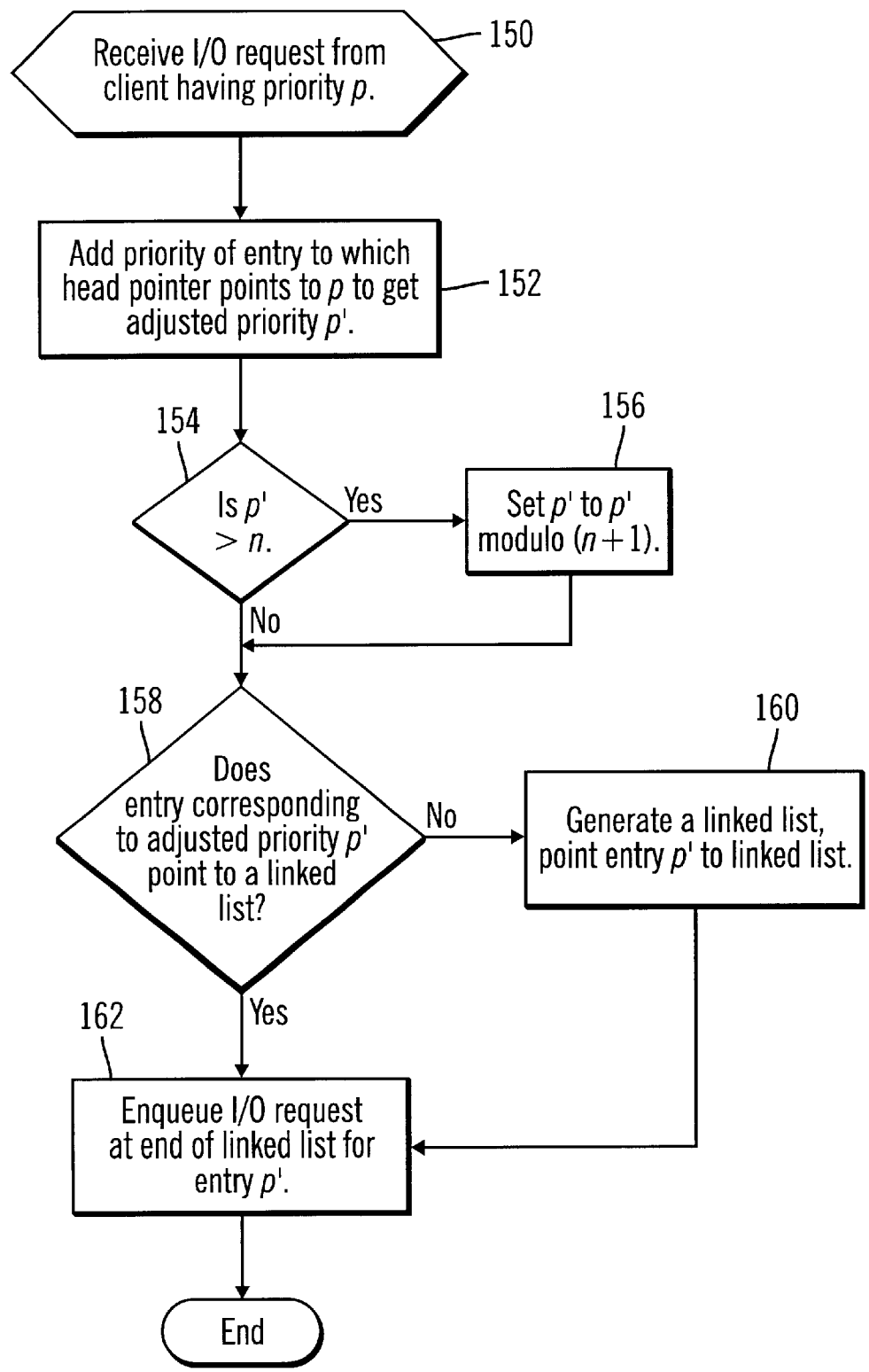
FIG. 4 illustrates logic to enqueue I/O requests in the queue illustrated in FIG. 2 in accordance with preferred embodiments of the present invention.

FIG. 4 illustrates logic implemented in the server 4 to enqueue I/O requests in the queue 8. Control begins at block 150 with the server 4 receiving an I/O request from one client 2a, b, c having priority p. The server 4 then performs an algorithm to adjust the priority p of the received request in a manner that effectively reduces the priority of the received request and at the same time increases the priority of already queued I/O requests relative to the received I/O request. This algorithm involves the server 4 adding (at block 152) the priority of the entry to which the head pointer 18 points to the priority p of the received I/O request to obtain adjusted priority p'. If p' is greater than n, then the server 4 sets (at block 156) p' top' modulo (n+1) to account for the circular nature of the queue 8. The server 4 then determines (at block 158) whether the entry corresponding to the adjusted priority p' points to a linked list. If not, then the server 4 generates (at block 160) a linked list and points the entry having priority p' to the generated linked list. If there is a linked list or one has been generated, then the server 4 enqueues the I/O request at the end of the linked list for entry p'.

With the logic of the preferred embodiments, currently queued I/O requests having a low priority will not be starved by a steady stream of I/O requests at a higher priority. The reason is that while the server 4 is processing a linked list of I/O requests at an entry, any new requests, even those having the highest priority, are queued in an entry following the entry of the head pointer 18 that the server 4 is currently processing. Further, because there is one additional entry, entry 0, new I/O requests are never queued in the same entry the server 4 is processing, i.e., the entry pointed to by the head pointer. Thus, a steady stream of high priority I/O requests will not prevent the server 4 from moving forward through the entries. Further, the logic of FIG. 4 automatically lowers the priority of new requests by adding the priority of the header entry. By reducing the priority of any new entries, the priority of the lower entries is relatively increased.

Figure 5A:
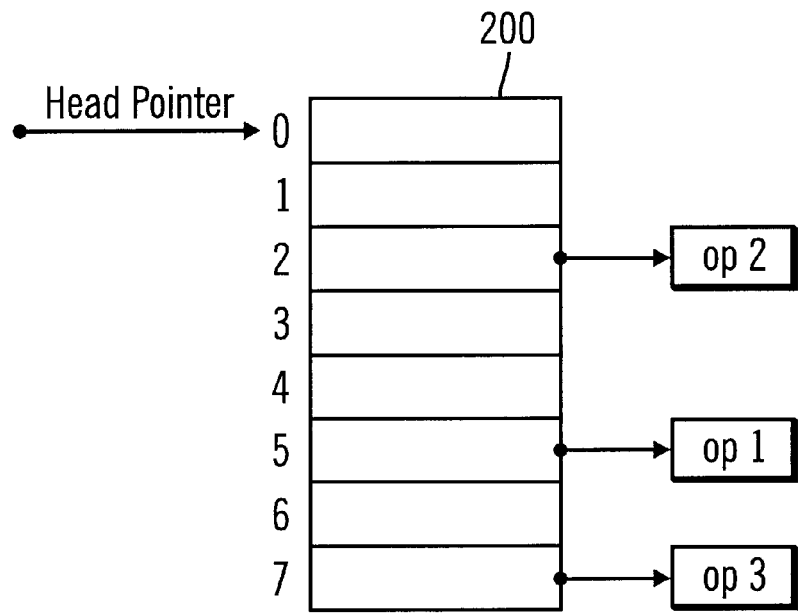
FIGS. 5a, b illustrate examples of how entries are enqueued and dequeued from the queue illustrated in FIG. 2 in accordance with preferred embodiments of the present invention.
Figure 5B:
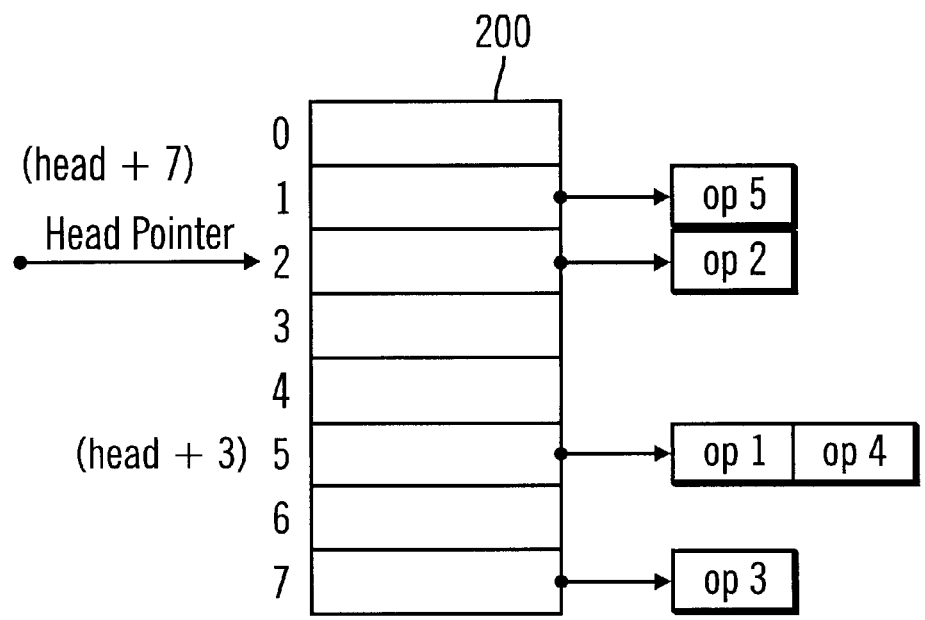

FIGS. 5a and 5b illustrate an example of how the logic of FIGS. 3 and 4 operate in a queue having 7 possible different levels of priority. With respect to FIG. 5a, queue 200 is filled with three I/O requests, ops 1, 2, and 3, having priority 5, 2, and 7, respectively. In FIG. 5b, the server 4 begins to process the queue 200 and moves the head pointer to entry 2, which is the first entry with an I/O request, op 2, to process. If, in FIG. 5b, a new I/O request (op 4) is received having priority 3, according to the logic of FIG. 4, the server 4 would add the current head pointer position, 2, to the priority 3 of op 4 to calculate the adjusted priority 5 of op 4. The server 4 would then add op 4 to the linked list for entry 5. In this way, the server 4 downgrades the priority of op 4. If another I/O request (op 5) was received having priority 7 when the head pointer is at entry 2, then the adjusted priority is 9, which would cause the server 4 to take the modulo of the adjusted priority and 8, i.e., the number of entries plus one, to get an adjusted priority of 1. The server 4 would then add op 5 to entry 1 as shown in FIG. 5b. Moreover, if the adjusted priority added to the head pointer extends past the last nth entry to entry 0, then the new I/O request will be queued at entry 0. For instance, with respect to FIG. 5b, if the head pointer is at entry 7 and the priority of a new request is 1, then the adjusted priority would be 8 modulo 8 or 0, which corresponds to the first entry, i.e., entry 0.

The preferred logic and queue data structure provides a technique for increasing priority that does not consume memory operations to move existing entries between priority queues. The only operation that is performed to modify the priority of I/O requests by the preferred logic is a simple algorithm to modify the priority of the new entry. This modification of the priority of the new entry both lowers the priority of the new entry and increases the relative priority of existing queued I/O requests in a manner that would prevent a stream of high priority I/O requests from starving currently pending lower priority I/O requests. Thus, the preferred embodiment queuing technique manipulates priority without performing the costly memory operations used in the prior art to move pending entries between queues.

With the preferred embodiments, the system can be designed to accommodate any number of priority levels without affecting memory processing as priority adjustment does not require moving lower priority queued requests between different priority queues. This reduces memory management operations associated with managing numerous queues. Thus, with the preferred technique there is no need for list manipulation. Instead, the priority adjustment is performed up-front with the use of simple adjustments and pointers with respect to a single queue.

Further embodiments utilize a bit map to increase the efficiency of steps 106 and 108 in FIG. 3 of incrementing the head pointer 18 to the next entry including a linked list of pending I/O requests. In these embodiments, a bit map including a value for each entry in the queue 8 is maintained. Initially, the bit map entries are set to "off" or binary zero. Whenever an I/O request is enqueued in a linked list pointed to by an entry, the corresponding bit map value for that entry is turned "on", i.e., binary one, thereby indicating that there are pending I/O requests for that entry. When the server 4 needs to move to the next entry including a linked list of I/O requests to process, the server 4 would first process the bit map to determine the first "on" value following the bit map entry pointed to by the head pointer. The server 4 would then convert this bit map value of "on" for the located entry to a binary number of the entry using bit map encoding techniques known in the art. In this way, when determining an entry to process that points to a linked list of pending I/O requests, the server 4 would process the bit map to directly determine the next entry having pending I/O requests. In this way, the server 4 does not have to check each entry to eventually locate one entry having pending requests.

Conclusion

The preferred embodiments may be implemented as a method, apparatus or article of manufacture using standard programming and/or engineering techniques to produce software, firmware, hardware, or any combination thereof.

The term "article of manufacture" (or alternatively, "computer program product") as used herein is intended to encompass one or more computer programs and/or data files accessible from one or more computer-readable devices, carriers, or media, such as magnetic storage media, "floppy disk," CD-ROM, optical disks, holographic units, volatile or non-volatile electronic memory, etc. Further, the article of manufacture may comprise the implementation of the preferred embodiments in a transmission media, such as a network transmission line, wireless transmission media, signals propagating through space, radio waves, infrared signals, etc. Of course, those skilled in the art will recognize many modifications may be made to this configuration without departing from the scope of the present invention.

Preferred embodiments were described with respect to operations performed by the server 4. The server may comprise any type of processing unit known in the art.

In preferred embodiments, the server 4 dispatches I/O requests to the storage system 12. If the storage system 12 comprises one or more disk drives, then the server 4 would perform the I/O request against the disk drive. If the storage system 12 comprises storage controllers, then the server 4 would send the request to the storage controller or control unit including the data volume that is the target of the I/O request.

In preferred embodiments, the clients 2a, b, c communicate priority with an I/O request. However, in further embodiments, if the clients 2a, b, c do not provide priority, then the server 4 may assign a default priority to the I/O request.

Preferred embodiments were described with respect to enqueuing and dequeuing I/O requests to a storage system 12. However, in alternative embodiments, the queue of the preferred embodiments may be used to queue any type of work or requests that need to be processed according to a priority. Preferred embodiments may involve queuing work other than I/O requests.

Preferred embodiments described an algorithm to reduce the priority of a new request by the priority of the entry pointed to by the head pointer. In alternative embodiments, the priority of the new I/O request may be incremented in alternative ways in a manner that places the new request at an entry that is different from the entry the server is currently processing.

In preferred embodiments, the queue was described as a circular queue in which the last entry points to the first entry. In alternative embodiments, the queue may be comprised of linked lists that are not circular.

In summary, preferred embodiments disclose a method, system, program, and data structure for queuing requests. Each request is associated with one of a plurality of priority levels. A queue is generated including a plurality of entries. Each entry corresponds to a priority level and a plurality of requests can be queued at one entry. When a new request having an associated priority is received to enqueue on the queue, a determination is made of an entry pointed to by a pointer. The priority associated with the new request is adjusted by a value such that the adjusted priority is associated with an entry different from the entry pointed to by the pointer. The new request is queued at one entry associated with the adjusted priority.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

**ESCON and IBM are trademarks or registered trademarks of International Business Machines Corporation in the United States and/or foreign countries.

What is claimed is:

1. A method for queuing requests to execute, wherein each request is associated with one of a plurality of priority levels, comprising:

generating a queue including a plurality of entries, wherein each entry corresponds to a priority level, and wherein a plurality of requests can be queued at one entry;

receiving a new request having an associated priority to enqueue on the queue;

after receiving the new request, determining an entry pointed to by a pointer;

adjusting the priority associated with the new request by a value, wherein the adjusted priority is associated with an entry different from the entry pointed to by the pointer, and wherein adjusting the priority includes adding a priority of the determined entry to the priority of the request to determine the adjusted priority; and queuing the new request at one entry associated with the adjusted priority.

2. The method of claim 1, further comprising:

determining an entry at which requests are queued;

modifying the pointer to point to the determined entry; and processing the requests queued at the entry pointed to by the pointer.

3. The method of claim 2, wherein determining the entry at which requests are queued, comprises:

generating a data structure indicating entries having queued requests; and processing the data structure to determine a first entry following the entry pointed to by the head pointer having queued requests.

4. The method of claim 2, wherein the queued requests comprise input/output (I/O) requests with respect to a storage system, and wherein processing the requests comprises dispatching the I/O request to perform the requested I/O operation.

5. The method of claim 1, wherein each entry is capable of pointing to a linked list and wherein queuing one new request at the entry comprises adding the new request to the linked list pointed to by the entry associated with the priority assigned to the request.

6. The method of claim 1, wherein adjusting the priority comprises:

determining the priority of the entry pointed to by the pointer.

7. The method of claim 6, wherein the last entry of the queue points to the first entry of the queue, and wherein adjusting the priority further comprises setting the adjusted priority to the adjusted priority modulo the number of entries in the queue if the adjusted priority is greater than the number of entries in the queue.

8. The method of claim 1, wherein the queue includes one extra entry in addition to one entry for each priority in the system.

9. The method of claim 8, wherein the new request is queued at an entry corresponding to the adjusted priority that is not the entry pointed to by the pointer.

10. A system for queuing requests to execute, wherein each request is associated with one of a plurality of priority levels, comprising:

means for generating a queue including a plurality of entries, wherein each entry corresponds to a priority level, and wherein a plurality of requests can be queued at one entry;

means for receiving a new request having an associated priority to enqueue on the queue;

means for, after receiving the new request, determining an entry pointed to by a pointer;

means for adjusting the priority associated with the new request by a value, wherein the adjusted priority is associated with an entry different from the entry pointed to by the pointer and wherein adjusting the priority includes adding a priority of the determined entry to the priority of the request to determine the adjusted priority; and means for queuing the new request at one entry associated with the adjusted priority.

11. The system of claim 10, further comprising:

means for determining an entry at which requests are queued;

means for modifying the pointer to point to the determined entry; and means for processing the requests queued at the entry pointed to by the pointer.

12. The system of claim 11, wherein the means for determining the entry at which requests are queued, comprises:

means for generating a data structure indicating entries having queued requests; and means for processing the data structure to determine a first entry following the entry pointed to by the head pointer having queued requests.

13. The system of claim 11, wherein the queued requests comprise input/output (I/O) requests with respect to a storage system, and wherein the means for processing the requests comprises means for dispatching the I/O request to perform the requested I/O operation.

14. The system of claim 10, wherein each entry is capable of pointing to a linked list and wherein the means for queuing one new request at the entry comprises means for adding the new request to the linked list pointed to by the entry associated with the priority assigned to the request.

15. The system of claim 10, wherein the means for adjusting the priority comprises:

means for determining the priority of the entry pointed to by the pointer.

16. The system of claim 15, wherein the last entry of the queue points to the first entry of the queue, and wherein the means for adjusting the priority further comprises means for setting the adjusted priority to the adjusted priority modulo the number of entries in the queue if the adjusted priority is greater than the number of entries in the queue.

17. The system of claim 10, wherein the queue includes one extra entry in addition to one entry for each priority in the system.

18. The system of claim 17, wherein the new request is queued at an entry corresponding to the adjusted priority that is not the entry pointed to by the pointer.

19. An article of manufacture for use in programming a processing unit to queue requests to execute, wherein each request is associated with one of a plurality of priority levels, the article of manufacture comprising computer readable storage media including at least one computer program embedded therein that causes the processing unit to perform:

generating a queue including a plurality of entries, wherein each entry corresponds to a priority level, and wherein a plurality of requests can be queued at one entry;

receiving a new request having an associated priority to enqueue on the queue;

after receiving the new request, determining an entry pointed to by a pointer;

adjusting the priority associated with the new request by a value, wherein the adjusted priority is associated with an entry different from the entry pointed to by the pointer, and wherein adjusting the priority includes adding a priority of the determined entry to the priority of the request to determine the adjusted priority; and queuing the new request at one entry associated with the adjusted priority.

20. The article of manufacture of claim 19, further comprising:

determining an entry at which requests are queued;

modifying the pointer to point to the determined entry; and processing the requests queued at the entry pointed to by the pointer.

21. The article of manufacture of claim 20, wherein determining the entry at which requests are queued, comprises:

generating a data structure indicating entries having queued requests; and processing the data structure to determine a first entry following the entry pointed to by the head pointer having queued requests.

22. The article of manufacture of claim 20, wherein the queued requests comprise input/output (I/O) requests with respect to a storage system, and wherein processing the requests comprises dispatching the I/O request to perform the requested I/O operation.

23. The article of manufacture of claim 19, wherein each entry is capable of pointing to a linked list and wherein queuing one new request at the entry comprises adding the new request to the linked list pointed to by the entry associated with the priority assigned to the request.

24. The article of manufacture of claim 19, wherein adjusting the priority comprises:

determining the priority of the entry pointed to by the pointer.

25. The article of manufacture of claim 24, wherein the last entry of the queue points to the first entry of the queue, and wherein adjusting the priority further comprises setting the adjusted priority to the adjusted priority modulo the number of entries in the queue if the adjusted priority is greater than the number of entries in the queue.

26. The article of manufacture of claim 19, wherein the queue includes one extra entry in addition to one entry for each priority in the system.

27. The article of manufacture of claim 26, wherein the new request is queued at an entry corresponding to the adjusted priority that is not the entry pointed to by the pointer.

28. A memory device accessible to a processing unit, wherein the memory device includes data structures comprising:

a queue including a plurality of entries, wherein there is an entry for each priority level and at least one additional entry, wherein a plurality of requests can be queued at any entry; and a pointer addressing one entry in the queue, wherein a priority associated with a new request is adjusted by adding a priority of the entry pointed to by the pointer to the priority associated with the new request, such that an adjusted priority is associated with an entry different from the entry pointed to by the pointer, and wherein the new request is queued at one entry associated with the adjusted priority.

29. The memory device of claim 28, further comprising a data structure indicating entries having queued requests, wherein the data structure is processed to determine a first entry following the entry pointed to by the head pointer having queued requests to process.

30. The memory device of claim 28, further comprising at least one linked list, wherein each entry is capable of pointing to one linked list and wherein queuing one new request at the entry comprises adding the new request to the linked list pointed to by the entry associated with the priority assigned to the request.

31. The memory device of claim 28, wherein the last entry of the queue points to the first entry of the queue, and wherein adjusting the priority further comprises setting the adjusted priority to the adjusted priority modulo the number of entries in the queue if the adjusted priority is greater than the number of entries in the queue.

* * * * *